United States Patent
Xie

(10) Patent No.: US 8,355,636 B2
(45) Date of Patent: *Jan. 15, 2013

(54) PMD INSENSITIVE DIRECT-DETECTION OPTICAL OFDM SYSTEMS USING SELF-POLARIZATION DIVERSITY

(75) Inventor: Chongjin Xie, Morganville, NJ (US)

(73) Assignee: Alcatel Lucent, Paris (FR)

( * ) Notice: Subject to any disclaimer, the term of this patent is extended or adjusted under 35 U.S.C. 154(b) by 121 days.

This patent is subject to a terminal disclaimer.

(21) Appl. No.: 12/947,358

(22) Filed: Nov. 16, 2010

(65) Prior Publication Data

US 2011/0280587 A1    Nov. 17, 2011

Related U.S. Application Data

(63) Continuation of application No. 11/856,002, filed on Sep. 14, 2007, now Pat. No. 7,860,406.

(51) Int. Cl.
*H04B 10/06* (2006.01)

(52) U.S. Cl. .......... 398/203; 398/204; 398/205

(58) Field of Classification Search ........... 398/203–205
See application file for complete search history.

(56) References Cited

U.S. PATENT DOCUMENTS

| | | | | | |
|---|---|---|---|---|---|
| 3,310,677 | A | * | 3/1967 | Pierce et al. | 398/205 |
| 4,972,515 | A | * | 11/1990 | Shibutani | 398/205 |
| 4,979,235 | A | * | 12/1990 | Rumbaugh et al. | 398/205 |
| 5,258,615 | A | * | 11/1993 | Thorley | 250/227.17 |
| 5,701,188 | A | * | 12/1997 | Shigematsu et al. | 398/148 |
| 6,055,081 | A | * | 4/2000 | Koyano et al. | 398/147 |
| 7,003,231 | B2 | * | 2/2006 | Way et al. | 398/186 |
| 7,206,520 | B2 | * | 4/2007 | Way et al. | 398/186 |
| 7,209,670 | B2 | * | 4/2007 | Fludger et al. | 398/205 |
| 7,376,360 | B2 | * | 5/2008 | Jennen | 398/205 |
| 7,860,406 | B2 | * | 12/2010 | Xie | 398/205 |
| 8,184,973 | B2 | * | 5/2012 | Qian et al. | 398/65 |
| 8,184,993 | B2 | * | 5/2012 | Djordjevic et al. | 398/205 |
| 2011/0280587 | A1 | * | 11/2011 | Xie | 398/202 |

\* cited by examiner

*Primary Examiner* — Danny Leung

(74) *Attorney, Agent, or Firm* — D. M. LaBruno

(57) ABSTRACT

A self-polarization diversity technique to combat PMD in a direct-detection optical OFDM system. This technique does not require any dynamic polarization control, and can simultaneous compensate PMD in a WDM system with one device. Simulation results show that this technique virtually completely eliminates the PMD impairments in direct-detection optical OFDM systems.

21 Claims, 5 Drawing Sheets

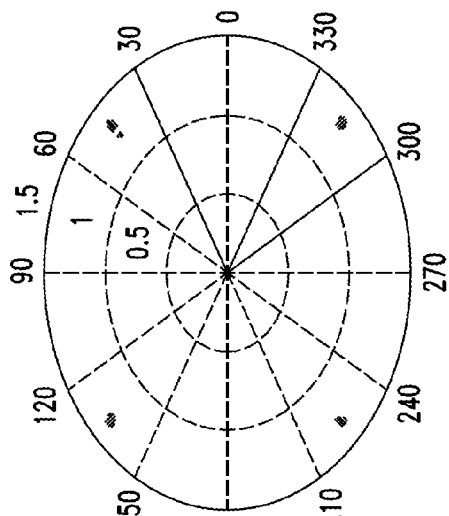
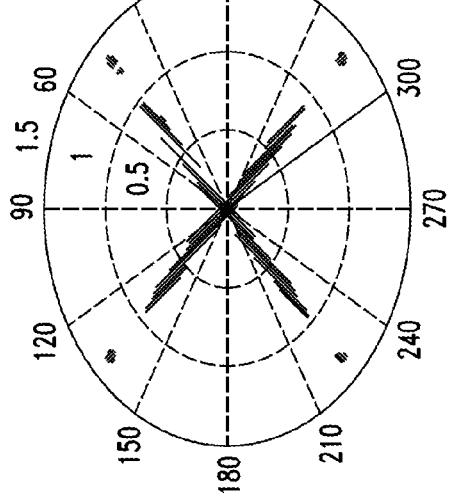
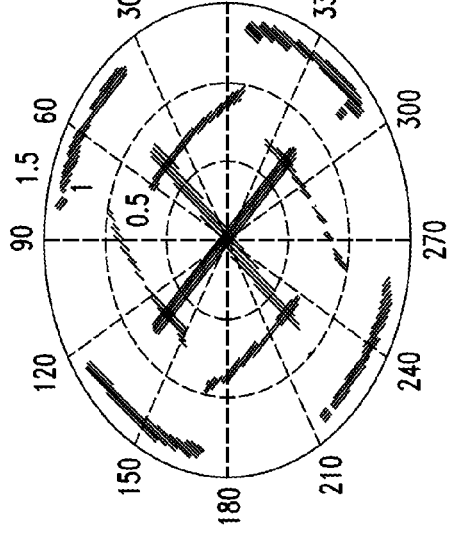

US 8,355,636 B2

PMD INSENSITIVE DIRECT-DETECTION OPTICAL OFDM SYSTEMS USING SELF-POLARIZATION DIVERSITY

This is a continuation of application Ser. No. 11/856,002, filed Sep. 14, 2007 now U.S. Pat. No. 7,860,406.

FIELD OF THE INVENTION

This invention relates generally to the field of optical communications and in particular to apparatus and methods that employ self-polarization diversity to compensate polarization mode dispersion (PMD) in direct-detection optical orthogonal frequency division multiplexing (OFDM) systems.

BACKGROUND OF THE INVENTION

Orthogonal frequency division multiplexing (OFDM) has been widely employed in RF wireless communication systems such as wireless cellular systems, digital audio and video broadcasting systems due to its desirable spectral efficiency, easy implementation, and robustness to multi-path propagation and phase distortion. Recently OFDM has been proposed for use in optical communication systems for example, to combat modal dispersion in multimode fiber and chromatic dispersion in single mode fiber.

As is known, there are two types of optical OFDM. One is direct-detection optical ODFM, which uses optical intensity modulation and direct-detection, and the other is coherent optical OFDM, which requires optical IQ modulation and optical coherent detection.

As the symbol rate of an OFDM signal is very low, polarization mode dispersion (PMD) does not cause any significant inter-symbol interference (ISI) in an optical OFDM system. Unfortunately however, PMD causes the state of polarization (SOP) to change with frequency. This SOP misalignment between sub-carriers and carrier induces signal fading, resulting in performance penalties for an optical OFDM system.

To compensate this effect, polarization diversity has been proposed for coherent optical OFDM systems (See, e.g., W. Shieh, W. Chen and R. S. Tucker, Electron Lett., vol. 42, no. 17, 2006). Fortunately, with a direct-detection optical OFDM system, the PMD penalties can be reduced by aligning the SOP of the carrier with the sub-carriers—as in a sub-carrier multiplexing system. Unfortunately however, this method requires dynamic polarization control and cannot completely eliminate the PMD impairments as the SOP misalignment among sub-carriers is not corrected.

SUMMARY OF THE INVENTION

An advance is made in the art according to the principles of the present invention whereby a self-polarization diversity technique is used to compensate PMD in a direct detection optical OFDM system. In sharp contrast to the prior art, the present invention does not employ dynamic polarization control while substantially eliminating PMD impairments in a direct-detection optical OFDM system.

According to an aspect of the invention an optical signal is received at a receiver where it is split into two independent optical signals. One of the independent signals is directed to a direct-detection optical OFDM receiver. The other one of the independent signals is first separated into optical carrier and sub-carrier components, the SOP of the optical carrier is rotated by substantially 90 degrees and the carrier and sub-carriers are then recombined and subsequently directed into another direct-detection optical OFDM receiver. The processed signals are then recombined and directed into a demodulator. Advantageously, PMD effects are substantially eliminated and there is no need for dynamic polarization control as prior art PMD compensators utilized. Finally, this technique may be used in a wavelength division multiplexed (WDM) system for all channels while employing only a single receiver device.

BRIEF DESCRIPTION OF THE DRAWING

A more complete understanding of the present invention may be realized by reference to the accompanying drawings in which:

FIG. 2 is diagram of the SOP of.

FIG. 3 is a series of constellation diagrams showing: FIG. 3(A) before phase correction; FIG. 3(B) after phase correction; and FIG. 3(C) with polarization diversity; where DGD=50 ps, and stars, circles and dots are for polarization angles of 0, $\pi/4$, and $\pi/3$ respectively;

FIG. 4 is a series of graphs showing.

DETAILED DESCRIPTION

Figure 1:
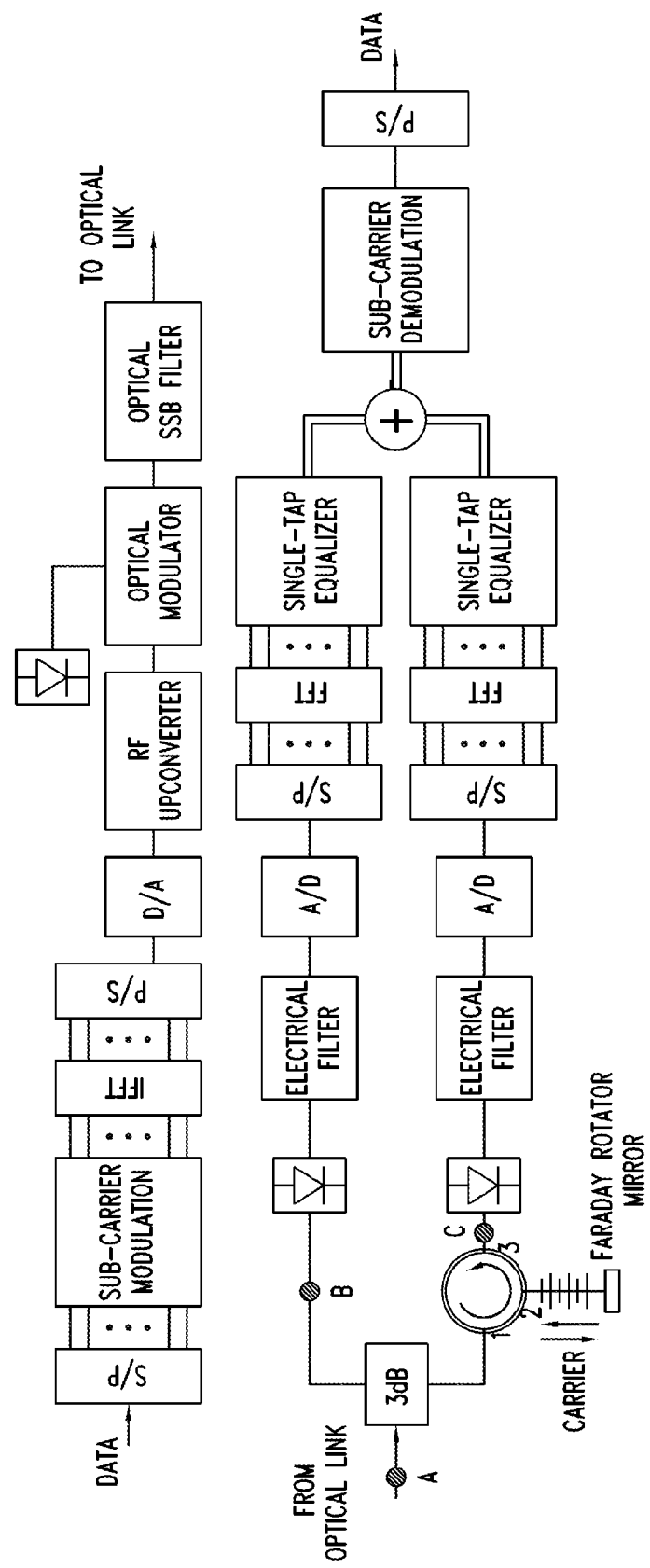
FIG. 1 is a schematic of a direct-detection optical OFDM with self-polarization diversity according to the present invention.

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

PMD Effects on Direct-Detection Optical OFDM System

In OFDM, signals are transmitted through a large number of orthogonal sub-carriers. The OFDM baseband signal is written as:

$$s(t) = \sum_{k=-\infty}^{\infty} w(t - kT_s) \sum_{i=1}^{N_{sc}} C_{i,k} \cdot \exp[j2\pi f_i(t - iT_s)], \; T_s = T_{ff} + T_g + T_w, \quad (1)$$

where $C_{i,k}$ is the information of the kth OFDM symbol at the ith sub-carrier, $N_{sc}$ is the number of sub-carriers, $T_s$, $T_{ff}$, $T_g$, and $T_w$ are the OFDM symbol period, effective part time, guard time and windowing time, respectively, $f_i=(i-1)/T_s$ is the frequency of the i-th sub-carrier, and w(t) is the windowing function.

Those skilled in the art will readily appreciate that the guard time is used to preserve the orthogonality among sub-carriers when there is partial symbol overlap induced by dispersion, and the windowing function to reduce the out-of-band spectrum. For a direct-detection optical OFDM system—at the transmitter—the complex baseband OFDM signal is converted to a real signal by modulating the real and imaginary components onto a RF-carrier. This signal is then converted to an optical signal by optical intensity modulation.

To understand how PMD affects direct-detection optical OFDM system performance, we assume that the signal is linear polarized and there is only $1^{st}$-order PMD. At the receiver side, the Jones vector of the carrier and sub-carriers are represented as $[\cos\theta\exp(-j\omega_0\Delta\tau/2), \cos\theta\exp(j\omega_0\Delta\tau/2)]^T$ and $[\cos\theta\exp(-j\omega_i\Delta\tau/2), \cos\theta\exp(j\omega_i\Delta\tau/2)]^T$, respectively, where $\omega_0$ and $\omega_i$ are angular frequencies of the carrier and sub-carriers, $\Delta\tau$ is the differential group delay (DGD), $\theta$ is input polarization angle, and superscript T is vector transpose.

The mixing term after the photodetector is expressed as:

$$f(\Delta\omega_i) = \cos^2\theta\exp[-j(\omega_0-\omega_i)\Delta\tau] + \sin^2\theta\exp[j(\omega_0-\omega_i)\Delta\tau]. \quad (2)$$

Those skilled in the art will readily recognize that equation (2) shows that PMD has two effects on optical OFDM system. More particularly, when the signal is aligned with a principal state of polarization (PSP) ($\theta=0$ or $\pi/2$), PMD induces phase shift, and when it splits equally between the two PSPs. $f(\Delta\omega_i)=\cos(\Delta\omega_i\Delta\tau/2)$, resulting in signal fading.

In a general case, there are both phase shifting and signal fading. The phase shift can easily be corrected by the "1-tap equalizer" in the OFDM receiver, but the signal fading cannot be equalized in amplifier spontaneous emission (ASE) noise limited systems, as increasing signal level also increases noise and thus no improvement can be obtained.

Direct-Detection Optical OFDM System with Self-Polarization Diversity

The schematic of a direct-detection optical OFDM system with self-polarization diversity is shown in FIG. 1. The transmitter—shown in the top portion of FIG. 1, is a conventional direct-detection optical OFDM transmitter. A receiver—constructed according to the present invention—is shown in the lower portion of FIG. 1.

When operational—at the receiver—a received signal is equally split into two portions through the effect of a splitter. As shown in FIG. 1, the splitter is a 3 dB 50/50 splitter. Those skilled in the art will appreciate that splitting ratios other than 50/50 are possible along with characteristics other than 3 dB.

Figure 2A:
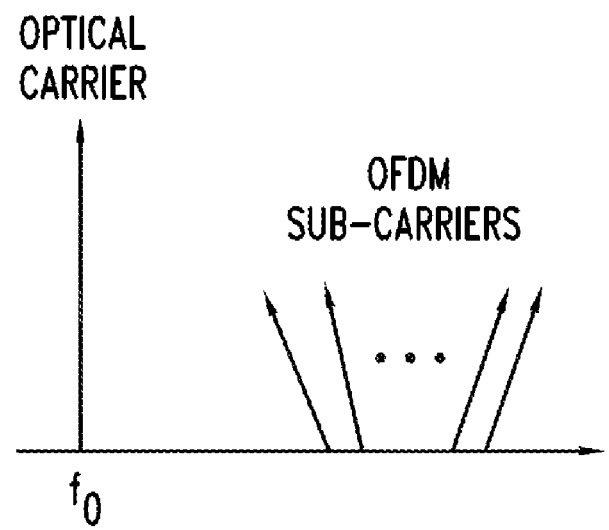
FIG. 2(A) carrier and sub-carriers at positions A and B at receiver shown in FIG. 1, and FIG. 2(B) carrier and sub-carriers at position C at receiver shown in FIG. 1.
Figure 2B:
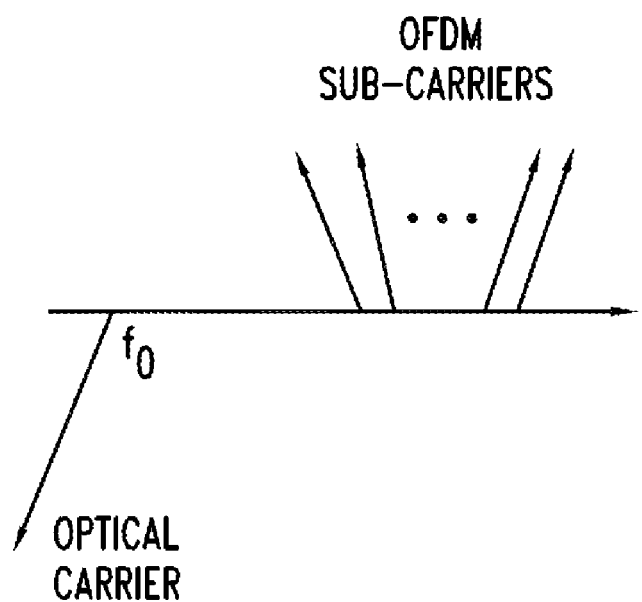

With simultaneous reference to FIG. 2(A) and FIG. 2(B) there is shown in FIG. 2 (A) the SOP of carrier and sub-carriers at positions A and 13 of the receiver shown in FIG. 1, while FIG. 2(B) shows the carrier and sub-carriers at position C of the receiver shown in FIG. 1. Those skilled in the art will of course recognize the polarization misalignment cause by PMD with respect to the optical carrier and OFDM sub-carriers shown in FIG. 2(A).

Continuing with the discussion of the receiver, one portion of the split signal goes to a direct-detection optical OFDM receiver. The other part goes to a circulator. A fiber Bragg grating (FBG) terminated with a Faraday rotator mirror is connected to port 2 of the circulator. Advantageously for our purposes, the FBG only lets the carrier pass through and reflects sub-carriers.

The Faraday rotator mirror rotates the carrier in such a way that its output SOP is orthogonal to its input SOP, no matter what the input SOP is. Therefore, the SOPs of sub-carriers at positions 13 and C of FIG. 1 are the same, while the carrier's SOP at these two positions are orthogonal to each other.

As those skilled in the art will readily appreciate, in this manner, polarization diversity is achieved without any dynamic polarization control. If the free spectral range (FSR) of the FBG is the same as channel spacing in a WDM system, the single device can be used in the WDM system to achieve the self-polarization diversity simultaneously for all the channels. The two parts are combined after the single-tap equalizer of the OFDM receiver and sent to the sub-carrier demodulation to restore data.

Simulation Results

To evaluate the present invention, a 10-Gb/s direct-detection OFDM system constructed according to the present invention may be understood through the use of simulations. A symbol period of 25.6 ns, guard time of 800 ps and window time of 800 ps are used in the simulations. There are 240 sub-carriers, which are modulated with quadrature phase shift keying (QPSK). The baseband OFDM signal occupies 5-GHz bandwidth, which is modulated onto an RF-carrier of 6 GHz using an I-Q modulator.

This signal is then modulated onto an optical carrier with a linear optical modulator. At the output of the modulator, a single-side band (SSB) filter removes one side-band and attenuates the carrier to make the same power in the optical carrier and sideband. A $3^{rd}$-order Gasssssian optical filter with a 20-GHz 3-dB bandwidth is used at the receiver to reject the ASE noise.

FIG. 3 shows the effects of O-order PMD on the received constellations. PMD causes both phase shift and signal fading. The phase shift can be easily corrected by the equalizer, as shown in FIG. 3 (B). The polarization multiplexing completely eliminate the signal fading, as illustrated in FIG. 3 (C).

Figure 4A:
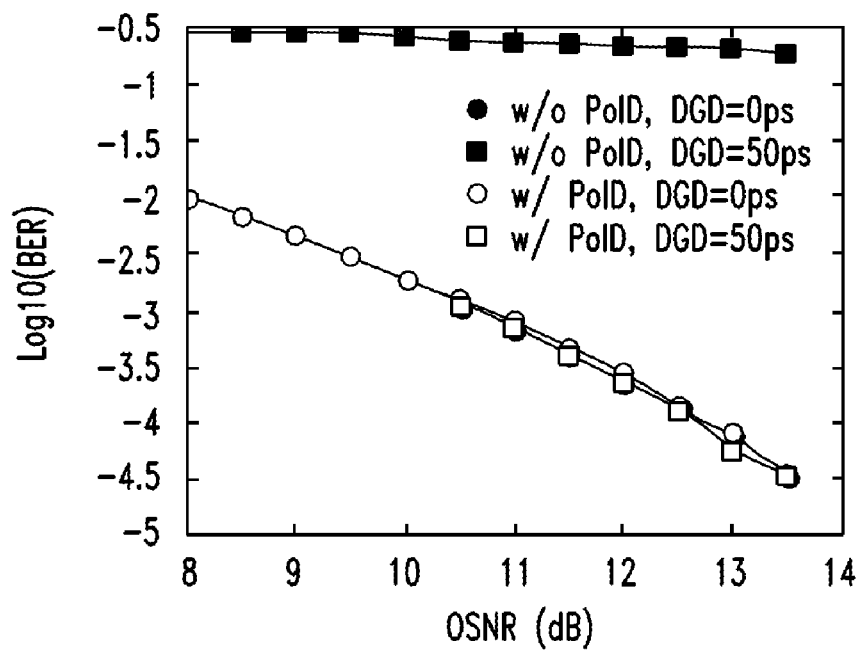
FIG. 4(A) BER vs. OSNR with and without $1^{st}$ order PMD in worst case.
Figure 4B:
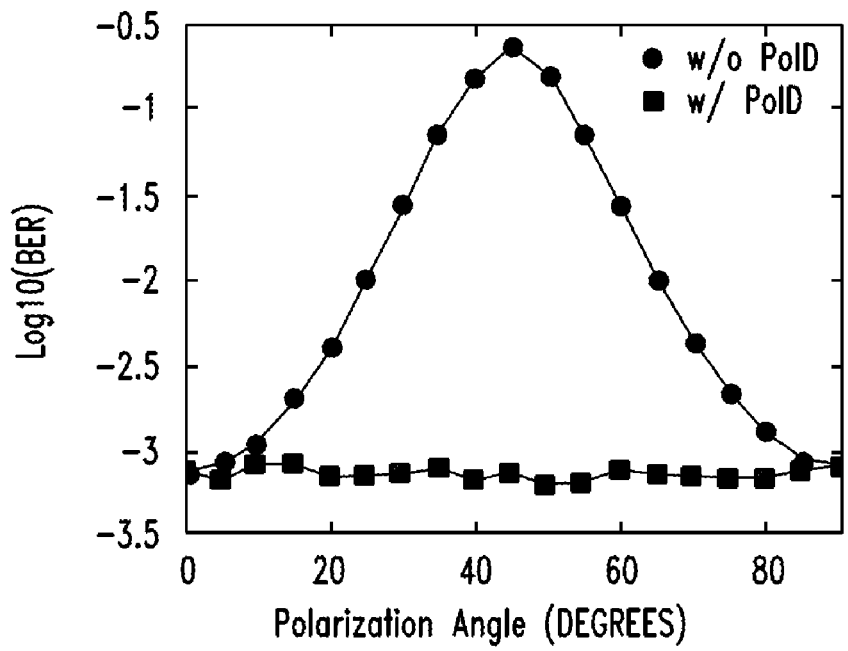
FIG. 4(B) BER vs. input polarization with order PMD of 50 ps at 11-dB OSNR PoID with and without polarization diversity.

Turning now to FIG. 4, there is shown the effects of $1^{st}$-order PMD on bit error rate (BER) of the direct-detection optical OFDM according to the present invention both with and without self-polarization diversity. To calculate BER, 1000 OFDM symbols are used. The optical signal to noise ratio (OSNR) is defined as the ratio of signal power (including carrier and sub-carriers) to ASE noise power in 0.1-nm bandwidth. It clearly illustrates that PMD causes big penalties in the direct-detection optical OFDM, but with the self-polarization diversity, PMD effects are virtually eliminated.

Figure 5:
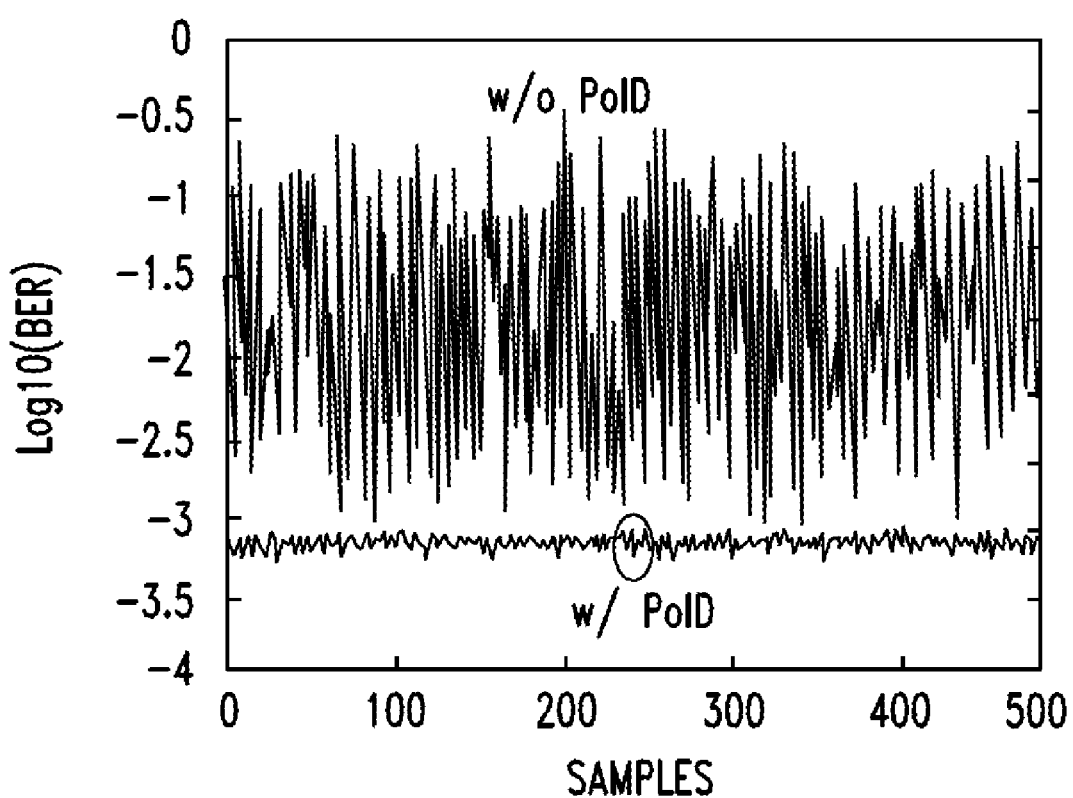
FIG. 5 is a graph showing samples of BER in a link with 100 ps average DGD at OSNR=11 dB.

FIG. 5 shows the performance of the self-polarization diversity in the presence of all-order PMD. Average DGD of 100 ps is used in the figure, and results of 500 PMD samples are given. It shows that BER of the direct-detection optical OFDM has a large fluctuation due to PMD (from 7.3e-3 to 0.35) when there is no self-polarization diversity, whereas when the self-polarization diversity is used, the PMD induced BER fluctuation is negligible.

At this point, while the present invention has been discussed and described using some specific examples, those skilled in the art will recognize that the teachings are not so limited. Accordingly, the invention should be only limited by the scope of the claims attached hereto.

The invention claimed is:

1. A method of receiving an optical signal, the method comprising:
   splitting an orthogonal frequency division multiplexed (OFDM) optical signal into a first portion and a second portion;
   directing the first portion to a first direct-detection OFDM receiver;
   directing the second portion to a circulator;
   rotating one of a carrier or sub-carriers portion of the second portion such that states of polarization of the one of the carrier or sub-carriers portion as measured before and after the circulator are orthogonal while states of polarization for the other of the carrier or sub-carriers portion of the second portion remain the same before and after the circulator;
   directing output of the circulator to a second direct-detection OFDM receiver;
   combining outputs of the first and second direct-detection OFDM receivers; and
   directing the combined outputs to a demodulator for demodulation of data.

2. The method of claim 1 wherein said splitting exhibits <5 dB loss.

3. The method of claim 2 wherein said splitting is performed by an asymmetric splitter.

4. The method of claim 2 wherein said splitting is performed by a symmetric 50/50 splitter.

5. The method of claim 1 wherein said rotating of the one of the carrier or sub-carriers portion is provided by an effect of an optical filter terminated with a Faraday rotator mirror.

6. The method of claim 5 wherein said optical filter is a fiber Bragg grating (FBG) filter.

7. The method of claim 1 further comprising:
   demodulating the combined outputs.

8. The method of claim 1 wherein said receiving of the optical signal occurs at a receiver.

9. An apparatus for receiving an optical signal, the apparatus comprising:
   a splitter for splitting an orthogonal frequency division multiplexed (OFDM) optical signal into a first portion and a second portion;
   a first direct-detection OFDM receiver for detecting the first portion;
   a circulator for rotating one of a carrier or sub-carriers portion of the second portion such that states of polarization of the one of the carrier or sub-carriers portion as measured before and after the circulator are orthogonal while states of polarization for the other of the carrier or sub-carriers portion of the second portion remain the same before and after the circulator;
   a second direct-detection OFDM receiver for detecting output of the circulator; and
   a combiner for producing a combined output based on output of the first direct-detection OFDM receiver and second direct-detection OFDM receiver.

10. The apparatus of claim 9 wherein said splitter exhibits <5 dB loss.

11. The apparatus of claim 10 wherein said splitter is an asymmetric splitter.

12. The apparatus of claim 10 wherein said splitter is a symmetric 50/50 splitter.

13. The apparatus of claim 9 wherein said circulator includes an optical filter and a Faraday rotator mirror.

14. The apparatus of claim 13 wherein said optical filter is a fiber Bragg grating (FBG) filter.

15. The apparatus of claim 9 further comprising a demodulator for demodulating data based on the combined output.

16. An apparatus for receiving an optical signal, the apparatus comprising:
   a splitter for splitting an orthogonal frequency division multiplexed (OFDM) optical signal into a first portion and a second portion;
   a first direct-detection OFDM receiver for detecting the first portion;
   a circulator for rotating a carrier portion of the second portion such that states of polarization of the carrier portion as measured before and after the circulator are orthogonal while states of polarization for a sub-carriers portion of the second portion remain the same before and after the circulator;
   a second direct-detection OFDM receiver for detecting output of the circulator; and
   a combiner for producing a combined output based on output of the first direct-detection OFDM receiver and second direct-detection OFDM receiver.

17. The apparatus of claim 16 wherein said splitter is an asymmetric splitter.

18. The apparatus of claim 16 wherein said splitter is a symmetric 50/50 splitter.

19. The apparatus of claim 16 wherein said circulator includes an optical filter and a Faraday rotator mirror.

20. The apparatus of claim 19 wherein said optical filter is a fiber Bragg grating (FBG) filter.

21. The apparatus of claim 16 further comprising a demodulator for demodulating data based on the combined output.

* * * * *